Figure 1:
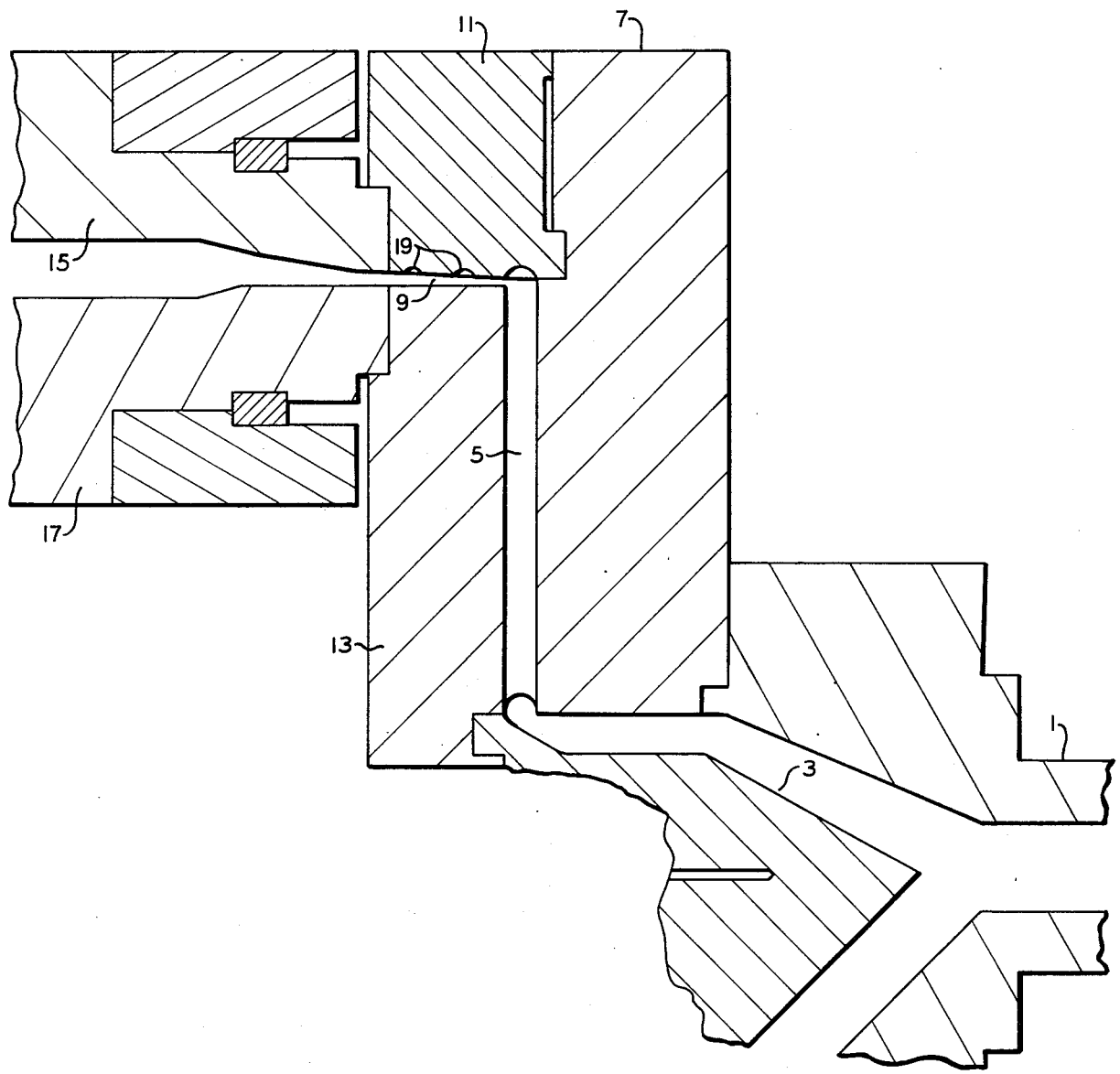

United States Patent [19]

Larsen

[11] 4,173,446

[45] Nov. 6, 1979

[54] CHOKE RING FOR PIPE EXTRUSION DIE

[75] Inventor: Olaf E. Larsen, Dallas, Tex.

[73] Assignee: Phillips Petroleum Company, Bartlesville, Okla.

[21] Appl. No.: 817,766

[22] Filed: Jul. 21, 1977

[51] Int. Cl.² ............................................. B29D 23/04
[52] U.S. Cl. .................................... 425/380; 138/177; 425/467
[58] Field of Search ............... 425/190, 192 R, 376 R, 425/380, 381, 461, 466, 467, 207, 208; 264/209; 72/264, 268, 269, 272; 366/69, 79, 340; 138/177

[56] References Cited

U.S. PATENT DOCUMENTS

| 3,694,123 | 9/1972 | Cook et al. ........................... 425/207 |
| 3,745,200 | 7/1973 | Geter .......................... 425/376 R X |
| 4,025,274 | 5/1977 | Uemura et al. .................. 425/207 X |

FOREIGN PATENT DOCUMENTS

| 749106 | 10/1970 | Belgium ................................... 425/207 |
| 1295177 | 5/1969 | Fed. Rep. of Germany .......... 425/207 |
| 44-619 | 9/1969 | Japan ....................................... 425/207 |

*Primary Examiner*—Mark Rosenbaum

[57] ABSTRACT

In the extrusion of plastic pipe in which polymer flows from an extruder into a spreader cone, through a plurality of channels in a distribution plate and through a choke passage for blending the plurality of flow streams from the individual channels in the distribution plate to form the sidewall of an extruded pipe, improved blending and welding of the polymer flow is accomplished by incorporating in the outer wall of the choke passage a plurality of elongated cavities with each cavity diminishing in depth and width from its upstream end to reach zero depth and width as the passage stretches downstream across the line of polymer flow. In preferred embodiments the cavities are tear-shaped with wall space in between and overlap at least an end of the nearest passage on either side as viewed in the direction of polymer flow.

5 Claims, 3 Drawing Figures

CHOKE RING FOR PIPE EXTRUSION DIE

BACKGROUND OF THE INVENTION

This invention relates to the extrusion of plastic pipe. In one of its aspects this invention relates to the extrusion of thick-walled, large diameter plastic pipe. In another of its aspects this invention relates to providing smooth exterior surfaces on extruded pipe.

In the extrusion of plastic pipe one of the problems most often encountered is the production of unsightly weld lines on the outside surface of the extrusion. As the diameter of the pipe increases, the thickness of the pipe wall is also usually increased to provide the necessary strength and rigidity in the final product. As pipe increases in diameter the mixing and blending of molten polymer merging from individual channels into a choke zone can be sufficiently poor that weld lines on the external surface become noticeable.

It is, therefore, an object of this invention to provide extruded pipe, particularly of large diameter, having superior external surface appearance. It is another object of this invention to provide apparatus and method for extruding plastic pipe with superior blending and welding of the polymer flow through a choke ring.

Other aspects, objects, and the various advantages of this invention will become apparent upon studying this specification, the drawing, and the appended claims.

STATEMENT OF THE INVENTION

In a pipe extrusion device in which polymer flows from an extruder into a spreader cone, through a plurality of channels in a distribution plate and through a choke passage for blending a plurality of flow streams from the distribution plate to form the sidewall of an extruded pipe, the improvement of a choke passage comprising in its outer wall a plurality of elongated cavities or hollows, each hollow diminishing in depth and width from its upstream end to reach zero depth and width as the elongated cavity extends downstream across the line of polymer flow, the hollows being arranged along the inner wall of the choke so that there is space in between and with overlapping of at least an end of the nearest cavity on either side as viewed in the direction of polymer flow.

In an embodiment of the invention a method for extruding a plastic pipe is also provided in which the extruded polymer flows through an extrusion device as set out above including a choke passage comprising in its outer wall a plurality of elongated cavities or hollows with each diminishing in depth and width from its upstream end to reach zero depth and width as the hollow extends downstream across the polymer flow, and with the hollows arranged along the outer wall of the choke so that they are spaced between and overlap at least an end of the nearest adjacent hollows as viewed in the direction of polymer flow so that molten polymer entering the upstream end of the hollowed passage is forced out of the cavity as it diminishes in depth and width. The polymer forced from the hollow passages is wiped along the wall of the choke passage by polymer flowing through the choke passage and blended with this polymer to form a smooth surface of polymer carried by the flow of polymer along the wall face.

The hollowed blending passages are best described as being of diminishing depth and width from the upstream end to a zero depth and width at the downstream end. As a practical matter in the production of choke rings having hollowed blending passages, the upstream, wider and deeper portion of each cavity will preferably be constructed with a ball end mill so that there is a curved surface for entry of molten plastic into the passage. The blending passages in the most preferred form can, therefore, also be described as tear-shaped cavities or passages.

It should be apparent that to attain the advantages of this invention the blending passages must stretch across the line of polymer flow through the choke chamber. To assure flow of molten polymer into and within the cavities the length must be aligned to lie in an at least partially upstream to downstream orientation. To combine the flow through the cavity and a wiping action the orientation of the elongated cavities is best described as lying generally, diagonally around the cylindrical surface of the choke chamber. Since there is a practical limit to the length of each cavity, to assure that there is a continuous flow of polymer all the way around the circumference of the choke chamber wall as it is forced from the elongated cavities, there must be some overlapping of the flow from the cavities. There must, therefore, be some overlapping of the elongated cavities as viewed along the path of polymer flow. In a preferred embodiment of the invention the overlapping of the elongated passages as viewed in the direction of polymer flow is about half the length of the nearest elongated passage on either side of any of the elongated passages. The overlapping may also be greater than half the length of the nearest passage, but a spacing with a minimum of overlap provides blending and welding of the polymer flow that prevents the appearance of weld lines on the external surface of extruded pipe. As long as there is at least a minimum overlap and an at least partial upstream-downstream orientation of each cavity there need be neither a formal pattern in the positioning of the elongated cavities nor uniformity in sizing of the cavities. A formalized pattern will, of course, facilitate construction.

Figure 2:
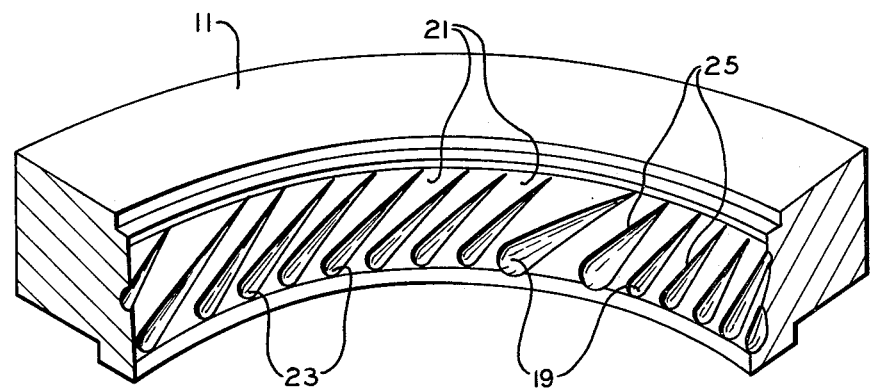
Figure 3:
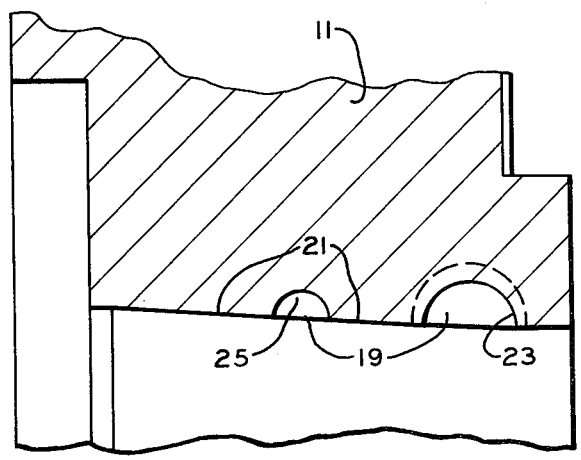

The present invention can be best understood in conjunction with the drawing in which:

FIG. 1 is a partial axial cross-section of a pipe extrusion device using the present invention, FIG. 2 is a fragmentary isometric view of the choke ring of this invention, and FIG. 3 is a cut-away view of a portion of a choke ring of the present invention.

Referring now to FIG. 1, molten plastic is passed from extruder 1 through a spreader passage 3 and into radial flow passages 5 in a distribution plate 7 so that the flow of molten polymer is evenly distributed from the extruder exit to radiate from a central core to the outer circumference of the pipe to be extruded. The extruder can be chosen from either dynamic or screw extruders. The flow passages on the distribution plate can be chosen from spoke wheel pattern, spider web pattern, or any of the usual channel-type flow patterns used in distributing plastic to the outer circumference of the extruded pipe.

The molten plastic is subjected to an abrupt change of direction from the flow of the flow passages 5 to the choke portion 9 of the die. This choke portion 9 is formed as a passage between the outer choke ring 11 and the inner choke ring 13. In this portion of the die a multiplicity of flows passing through the flow passages in the distribution plate 5 are welded together to form the sidewall of the pipe being produced. There has been, in the past, a problem with insufficient mixing of flow from the individual flow passages so that weld lines are formed where the flow from the individual passages comes together. These weld lines are not eliminated by the passage of the welded polymer between the die ring 15 and mandrel 17 in the forming of the pipe sidewall. The problem becomes more pronounced as the diameter of the piping being extruded increases to a size which requires relatively thick sidewalls for rigidity.

The present invention lies in a modification of the exterior choke ring 11 to provide tear-shaped passages 19 in the choke ring. As shown in FIG. 2, these tear-shaped passages 19 extend from the point of entry of material from the flow passages on the distribution plate 5 to conduct material along the wall of the choke ring in a flow that extends from the upstream to the downstream portion of the choke ring in a direction curving across the face of the choke ring so that flow of the material through the choke portion of the die is directed across flow emerging from the tear-shaped passages in the choke ring. The tear-shaped passages are of greatest depth and width at the point of entry of flow into the choke zone from the flow passages of the distribution plate. The tear-shaped passages diminish both in depth and width as they extend downstream along the face of the choke ring. This diminishing depth and width causes material that has been directed into the tear-shaped passages to be forced out and wiped along the surface of the choke ring by the preponderant flow of molten polymer passing through the choke area. This wiping action at what will be the outer surface of the extruded pipe sidewall produces a better mixing action of molten polymer at that surface and, because of the relatively broad sweep across the length of the tear-shaped passages, helps to eliminate weld lines at the surface of the extruded pipe sidewall.

As is better pointed out in FIGS. 2 and 3, the overlapping of a tear-shaped flow passage with at least those immediately adjacent when looking along the line of flow provides even more efficient mixing and smoothing of the surface of the exterior of the extruded pipe.

In FIG. 2 the pictured overlapping of flow depicts each tear-shaped passage overlapping about half of the adjacent tear-shaped flow passage with sufficient interspace 21 between the flow passages 19 to assure that each of the passages is distinct within itself.

In FIG. 3 the side view of the choke ring 11 shows an upstream, larger portion 23 of one flow passage and a downstream, smaller portion 25 of a second flow passage. Comparing FIGS. 2 and 3, it is apparent how plastic material flowing into the tear-shaped passages is pushed along and squeezed out as passages become progressively more narrow and more shallow. The polymeric material picked up by the flow along the passage as the polymeric material emerges from the tear-shaped flow passages forms a well mixed, consistent surface with minimal weld lines.

A choke ring of this design can be used to replace the conventional outer choke ring in pipe extrusion dies.

I claim:

1. In a pipe extrusion device in which polymer flows from an extruder into a spreader cone, through a plurality of individual channels in a distribution plate and through a choke passage for blending the plurality of flow streams from the distribution plate to form the sidewall of an extruded pipe, the improvement of a choke passage comprising in its outer wall a plurality of elongated cavities, each cavity diminishing in depth and width from its upstream end to reach zero depth and width as the passage extends downstream across the line of polymer flow, said cavities being spaced between and overlapping at least an end of the nearest cavity on either side viewed in the direction of polymer flow.

2. The improvement of claim 1 wherein said elongated cavities are arranged to lie generally, diagonally around the inner cylindrical surface of the outer wall of the choke passage in a formal pattern.

3. The improvement of claim 2 wherein said elongated cavities are tear-shaped.

4. The improvement of claim 3 wherein said elongated cavities are not of uniform sizing.

5. A choke ring for use in a pipe extrusion device, said ring defining a passage delineated by an outer wall having a plurality of elongated cavities, each cavity diminishing in depth and width from its upstream end to reach zero depth and width as the passage extends downstream, said cavities having wall space between them and said cavities at least overlapping as viewed along the choke passage wall in the direction of polymer flow.

* * * * *